(12) United States Patent
Georgiev

(10) Patent No.: US 6,734,851 B2
(45) Date of Patent: *May 11, 2004

(54) ANALYTIC WARPING

(75) Inventor: Todor Georgiev, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/423,269

(22) Filed: Apr. 24, 2003

(65) Prior Publication Data

US 2003/0184565 A1 Oct. 2, 2003

Related U.S. Application Data

(63) Continuation of application No. 09/247,007, filed on Feb. 8, 1999, now Pat. No. 6,573,889.

(51) Int. Cl.$^7$ .............................................. G06T 15/00
(52) U.S. Cl. ..................... 345/419; 345/473; 345/622
(58) Field of Search ................ 345/419, 473, 345/589, 590, 591, 622, 629

(56) References Cited

U.S. PATENT DOCUMENTS

| | | | |
|---|---|---|---|
| 5,175,808 A | | 12/1992 | Sayre |
| 5,515,489 A | * | 5/1996 | Yaeger ........................ 345/473 |
| 5,704,026 A | | 12/1997 | Wan |
| 5,732,230 A | * | 3/1998 | Cullen et al. ................. 345/764 |
| 5,963,213 A | | 10/1999 | Guedalia et al. |
| 6,016,148 A | | 1/2000 | Kang et al. |
| 6,075,885 A | | 6/2000 | Taniguchi et al. |
| 6,147,692 A | | 11/2000 | Shaw et al. |
| 6,204,859 B1 | | 3/2001 | Jouppi et al. |
| 6,225,974 B1 | | 5/2001 | Marsden et al. |
| 6,323,879 B1 | * | 11/2001 | Sauerbrei ...................... 345/672 |
| 6,384,835 B1 | * | 5/2002 | Reiter et al. ................... 345/582 |
| 6,426,745 B1 | * | 7/2002 | Isaacs et al. ................... 345/419 |
| 6,573,889 B1 | * | 6/2003 | Georgiev ........................ 345/419 |

OTHER PUBLICATIONS

"Cauchy Integral Formula" Eric Weisstein's World of Mathematics http://mathworld.wolfram.com/CauchyIntegralFormula.html by Eric W. Weisstein, 1999 CRC Press LLC, 1999–2003 Wolfram Research, Inc., pp. 1–3.*
"Analytic Function" Eric Weisstein's World of Mathematics http://mathworld.wolfram.com/AnalyticFunction.html by Eric W. Weisstein, 1999 CRC Press LLC, 1999–2003 Wolfram Research, Inc., pp. 1–2.*
"Avid Elastic Reality for Power Macintosh, Windows, and SGI workstations," Avid Technology, Inc., 1997, 3 pgs.
Beier et al., "Feature–Based Image Metamorphosis," Computer Graphics, 26, Jul. 2, 1992, 8 pgs.
J.B. Conway, "Functions of One Complex Variable," Graduate Texts in Mathematics, Springer–Verlag, 1973, 33–44, 81–88, 91–92.
R.W.G.Hunt, "Measuring Colour," Second Ed. Ellis Horwood, 1991, 9 pgs.
Klaus et al., "Robot Vision," The MIT Press, 1986, 164–169.
W. K. Pratt, "Digital Image Processing," Second Edition, A Wiley—Interscience publication, 1991, 518–525.
Thorell et al., "Using Computer Color Effectively," Hewlett Packard, Prentice Hall, N.J., 173–176.

* cited by examiner

*Primary Examiner*—Mark Zimmerman
*Assistant Examiner*—Enrique L Santiago
(74) *Attorney, Agent, or Firm*—Fish & Richardson P.C.

(57) ABSTRACT

A computer-implemented system performs a conformal warp operation using a unique warping function to map a first area to a second area. The first area is defined by a first enclosing contour and the second area is defined by a second enclosing contour. The system defines the first enclosing contour; modifies the first enclosing contour into the second enclosing contour; generates an analytic function to conformally warp the first area into the second area; and performs the conformal warp using the analytic function.

63 Claims, 7 Drawing Sheets

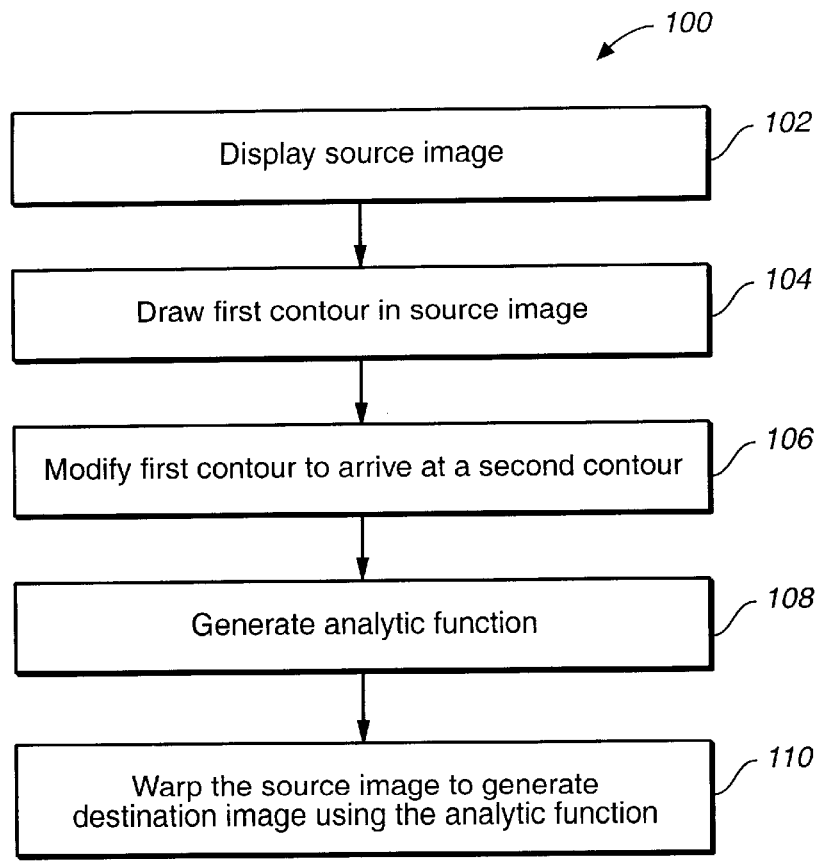
FIG._1
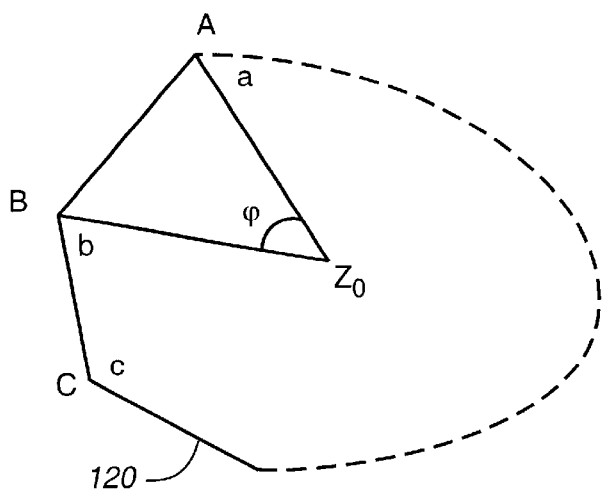
FIG._2

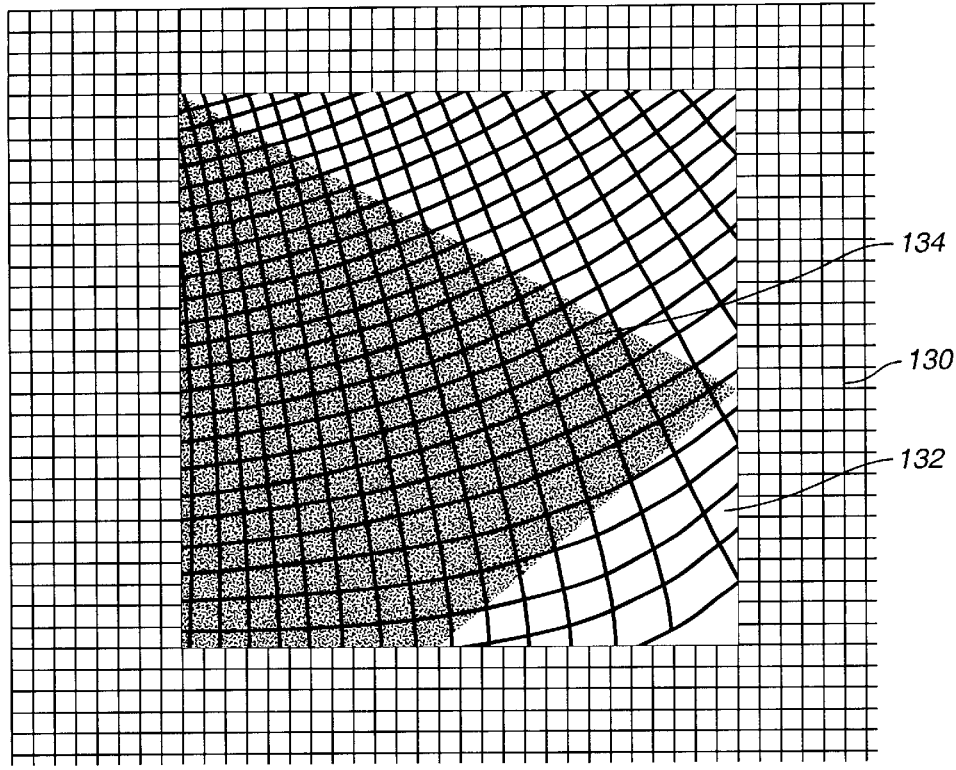
FIG._3
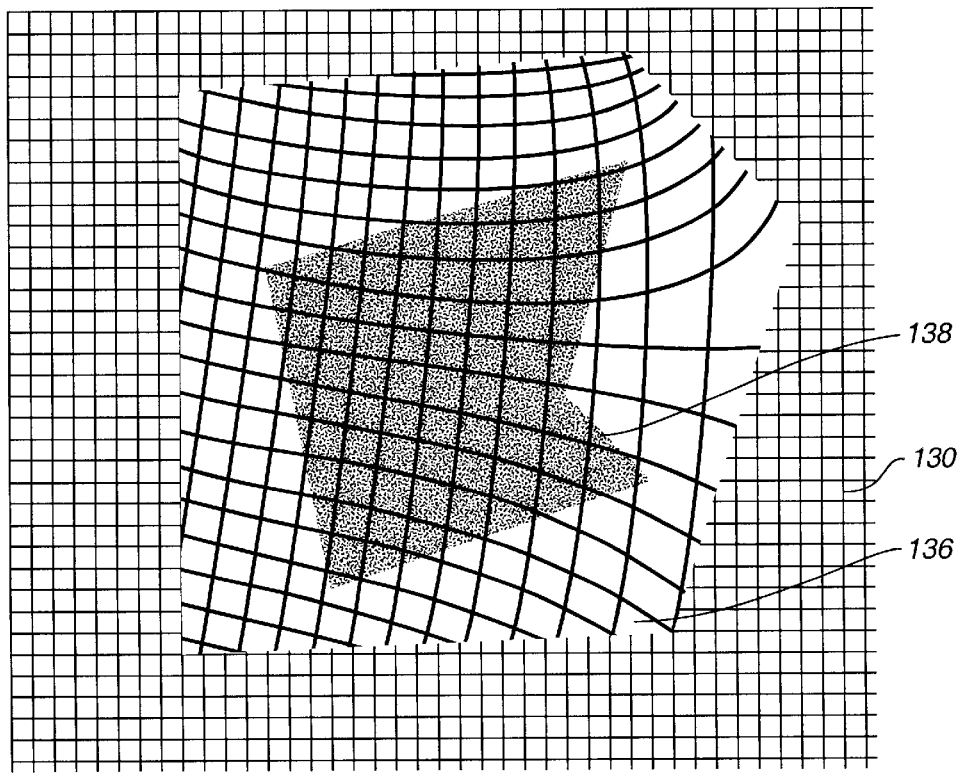
FIG._4

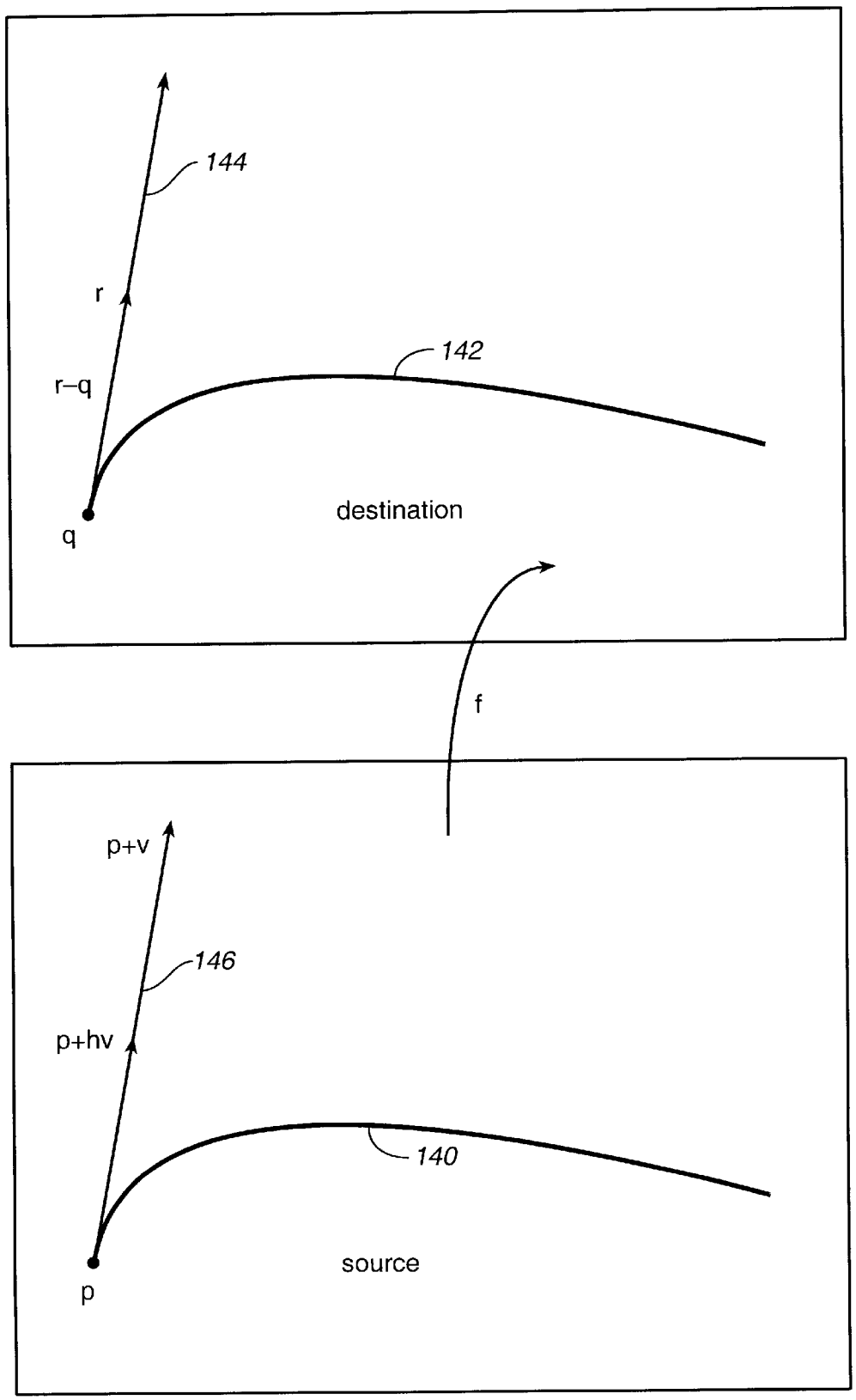
FIG._5

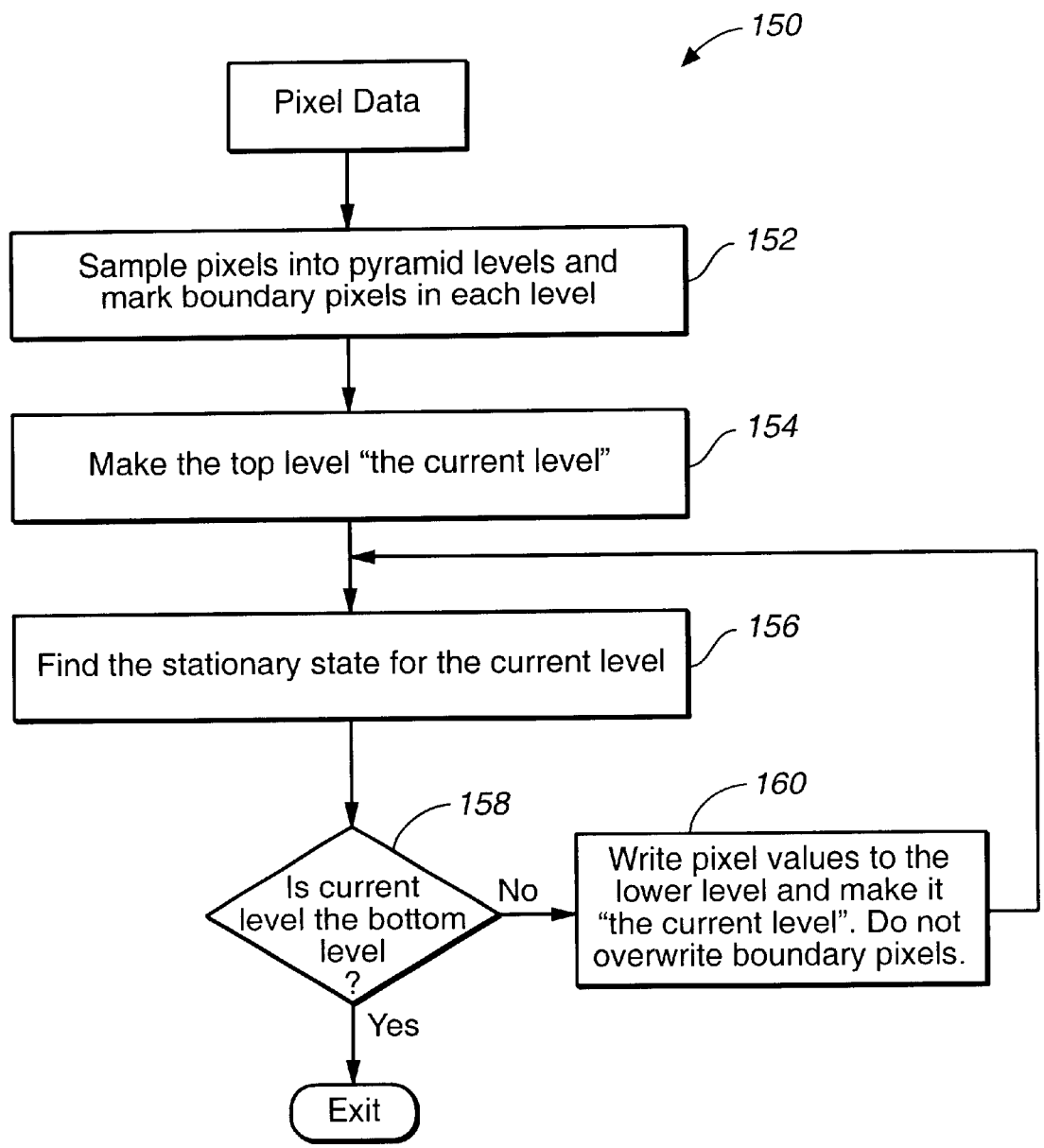
FIG._6

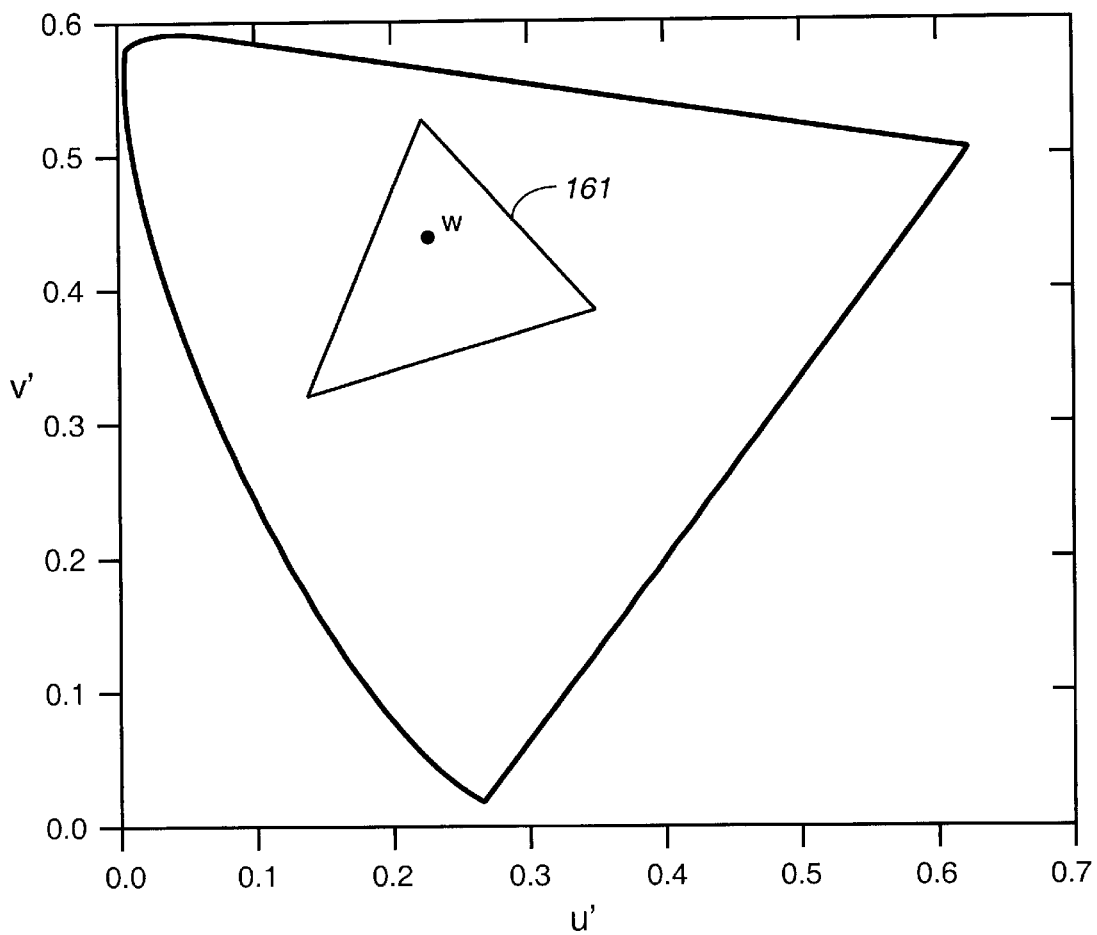
FIG._7

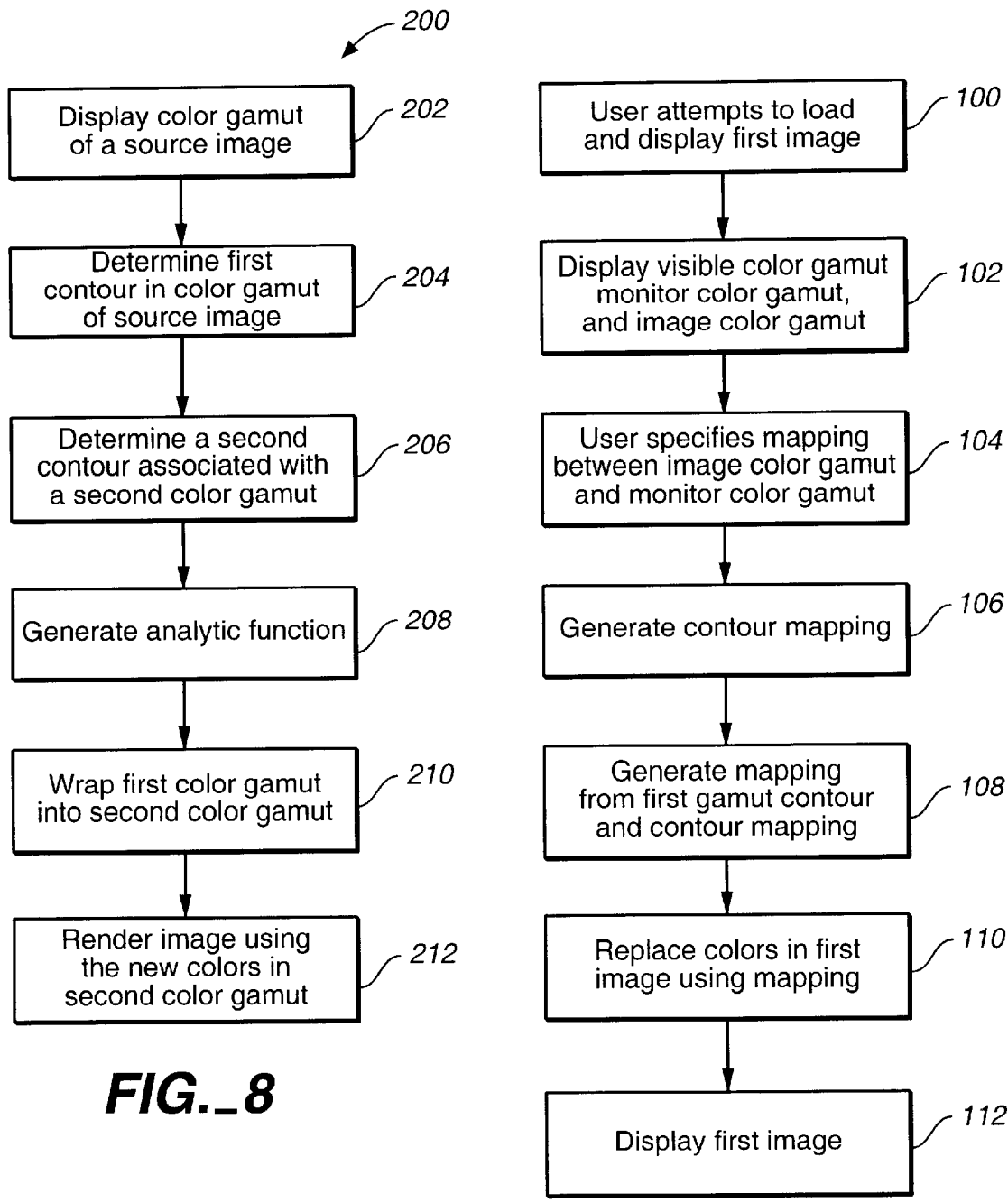
FIG._8
FIG._9

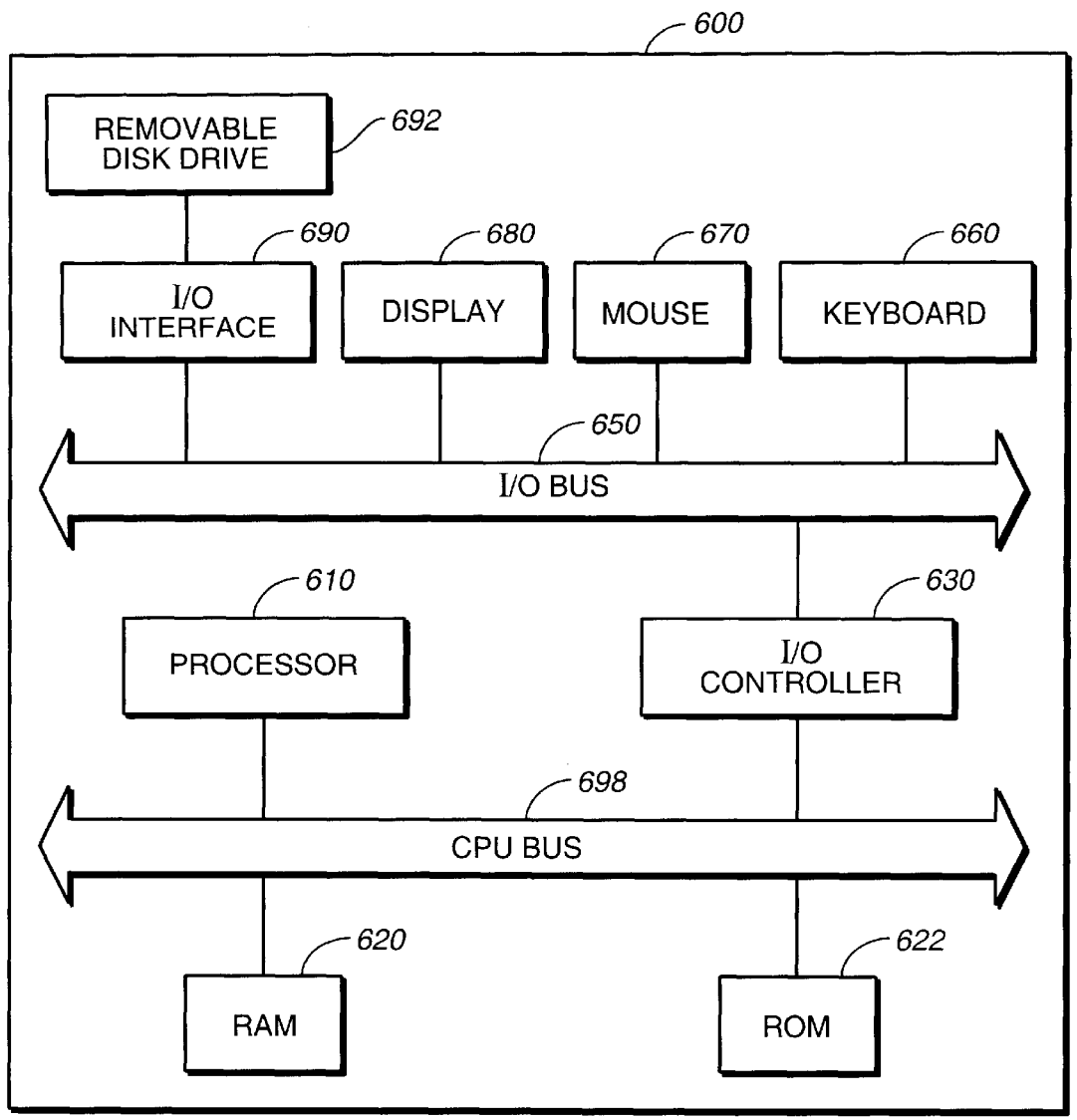
FIG._10

ANALYTIC WARPING

RELATED APPLICATIONS

This application is a continuation of U.S. patent application Ser. No. 09/247,007, filed Feb. 8, 1999, now U.S. Pat. No. 6,573,889, issued Jun. 3, 2003, the entire contents of which are hereby incorporated by reference.

BACKGROUND

The present invention relates to computer-implemented methods for manipulating shape and color of images.

In many graphics applications, a special effect operation known as "warping" or "morphing" is used to gradually transform one image into another image. This is accomplished by creating a smooth transitional link between the two images. Some computer programs, for example, use warping to generate an animation sequence using the image transformations. Such an animation might, for example, show a first person's face transforming into a second person's face.

The warping process preserves features associated with each image by mapping the features from a source image to corresponding features in a destination image. In particular, mesh warping warps a first image into a second image using a point-to-point mapping from the first image to the second image. A first lattice (mesh) is superimposed on the first image and second lattice is superimposed on the second image. For each point in the first lattice, a one-to-one correspondence with a corresponding point in the second lattice is defined. Mesh warping is generally described in George Wolberg, Digital Image Warping, IEEE Computer Society Press (1990). Variations on mesh warping include a version in which the user specifies lines on the first image corresponding to lines on the second image. These user-specified lines are used to construct corresponding lattices, which are used to morph the first image into the second image, as described above.

It is also possible to perform warping by specifying a first closed contour (such as a circle, a square or other) in the first image and a corresponding second closed contour in the second image. Points inside the first closed contour are warped to points inside the second closed contour. For instance, a software package called Elastic Reality, available from Avid Technology, Inc., provides a shape-based interface in place of mesh-based controls. This software allows users to use drawing tools and Bezier curves to define and edit multiple areas of an image to be manipulated over time.

Different transformations exist for warping from a first shape to a second shape with varying displacements of points inside each shape. One type of transformation for the inside points is a transformation that preserves the angles between any two intersecting curves and thus allow small shapes inside warping area to remain unchanged. Although conventional software transforms one shape into another, they do not preserve the angles between intersecting curves.

On a parallel note, color in computer graphics is defined in terms of "color spaces", which are related to real or imaginary display devices such as monitors and color printers. Various color spaces are used to represent color on computers. Each image is associated with a color space which defines colors according to a combination of properties. For example, in an RGB (Red Green Blue) color space, each color is represented by a combination of red, green, and blue components. In a CMYK (Cyan Magenta Yellow Black) color space, each color is represented as a combination of cyan, magenta, yellow, and black. The color space is represented as a multi-dimensional vector space such as a three-dimensional space. Each point in such a three-dimensional color space corresponds to a color having amounts of red, green, and blue corresponding to the point's coordinates.

An output device such as a computer monitor or printer is capable of reproducing a limited range of colors. An output device's "color gamut" is the set of colors that the output device is capable of reproducing. Similarly, the "visible color gamut" is the set of colors that the human eye is capable of perceiving. Color gamuts can be represented as a two-dimensional projection of their three-dimensional representations onto the plane of constant luminance.

A color gamut can be represented graphically in a color space's coordinate system by a chromaticity diagram which represents the color gamut as a shape enclosing the coordinates of the colors contained in the color gamut. The visible color gamut, for example, appears as a three-dimensional oval shape when displayed in most coordinate systems. The color gamut of a computer monitor is typically smaller than the visible color gamut. Because it is generated using three types of phosphor, the color gamut of a monitor typically appears as a triangular shape falling within the visible color space's oval when displayed graphically.

Each pixel in a graphical image typically has a color associated with it. Some colors in an image may not fall within a particular output device's color gamut, and therefore cannot be reproduced exactly on the output device. One approach to reproducing such colors on the output device is referred to as "gamut compression" or "gamut mapping." There is a point within the output device's color gamut that represents the color produced by maximum intensity of the three primary colors (R,G,B) of the device. This color represents the balance between the three primaries of the real or imaginary device. It is usually close to white and is referred to as the "white point." A straight line is constructed from the white point to the point representing the color to be reproduced. The color may then be mapped to the point at which the line intersects the boundary of the output device's color gamut. This process is also called clipping. Alternatively, the line may be extended until it intersects with the visible color gamut. The line is then compressed by appropriate scaling so that it fits entirely within the output device's color gamut. In this way, each point on the original (non-compressed) line is mapped to a corresponding point on the compressed line. This process is called desaturation and represents "moving toward" the white point. For example, "saturation" is always "moving away" from the white point.

In this way, conventional color corrections are related to color spaces and explicitly use the white point of the corresponding color space. The reference to the white point over-emphasizes certain colors, namely those at or near the white point, and introduces unnatural, device-dependent color transformations in the color correction process.

SUMMARY

In one aspect, a computer-implemented method for mapping a first area to a second area is disclosed. The first area is defined by a first enclosing contour and the second area is defined by a second enclosing contour. The method includes defining the first enclosing contour; modifying the first enclosing contour into the second enclosing contour; generating an analytic function to conformally warp the first area into the second area; and performing the conformal warp using the analytic function.

In a second aspect, a computer-implemented method maps a first color gamut to a second color gamut. In this aspect, the first color gamut is enclosed by a first enclosing contour and the second color gamut is enclosed by a second enclosing contour. The method includes defining the first enclosing contour; modifying the first enclosing contour into the second enclosing contour; generating an analytic function to conformally warp the first color gamut into the second color gamut; and performing the gamut mapping using the analytic function.

Advantages of the invention include one or more of the following. One advantage of the invention is that it provides a method for warping from a first image to a second image based on a first contour and a second contour, without requiring the user to define mappings from individual points within the fist contour to individual points within the second contour. Rather, the user needs to only specify the first and second contours and correspondences between them. This increases the ease of use with which the user can define a mapping between the first and second images and also allows for a more uniform warping which preserves angles.

Further, the ability to warp a first color gamut into a second color gamut is particularly advantageous. Such warping can be used to produce visually interesting effects such as producing an animation sequence in which a daytime scene is transformed into a sunset scene, for example.

Moreover, the use of contours rather than meshes to define mappings decreases the sophistication required of the user in using the invention. It is much easier and more intuitive for the user to draw shapes around corresponding areas in the first and second images or first and second color gamuts, rather than for the user to define point-to-point or color-to-color mappings.

In the case of color gamut warping, the graphical display of multiple color gamuts provides the user with the ability to quickly identify colors within the first color gamut that do not fall within the second color gamut. Specification of the mapping between the two color gamuts by drawing contours around graphical representations of the color gamuts provides the user with an intuitive interface to the warping process, mapping from one device gamut to a second device gamut.

Because using analytic functions to map a first color gamut to a second color gamut preserves the angles, it preserves the relationships among colors and the general appearance of the image after the transformation. In particular, the lines of constant hue and constant saturation are mapped into lines that can be interpreted as lines of constant hue and saturation because they remain orthogonal at the points of intersection after the transformation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a flow chart of a process for warping a first area into a second area using an analytic function.

FIG. 2 shows an exemplary contour represented as a polygon.

FIGS. 3 and 4 show applications of the process of FIG. 1 to a picture of a square mesh.

FIG. 5 shows segments of a path before and after a warp transformation.

FIG. 6 is a process for warping pixel data.

FIG. 7 is a diagram of the visible color gamut and a device color gamut.

FIG. 8 is a flow chart of a method for warping a first color gamut into a second color gamut using an analytic function.

FIG. 9 is a flow chart of a process for warping a first color gamut to a second color gamut.

FIG. 10 is a diagram of computer system which is used to perform the processes of the invention.

Like reference symbols in the various drawings indicate like elements.

DETAILED DESCRIPTION

FIG. 1 shows a flow chart of a process 100 for warping a first area into a second area using an analytic function. Initially, a source image is displayed on a computer screen for viewing by a user (step 102). The user draws a first contour, or a closed curve, on the source image (step 104). The user then manipulates the first contour to arrive at a second contour (step 106). An analytic (or conformal) warping function is generated to provide a unique conformal mapping function from the interior of the first contour into the interior of the second contour (step 108). Next, the source image is warped, or mapped, to generate a destination image using the analytic function (step 110).

Analytic Warping of Point Data

Step 108 represents the generation of analytic warping function for point data. The input to step 108 includes two contours, each described as a polygon, and a correspondence between vertexes of the first and second polygons. The polygons can be constructed by sampling two continuous curves on the source image. The vertex to vertex correspondence for the two contours can be defined by the user, or can be established using length parameters of both contour curves, starting from the correspondence for one point defined by a user. The process loops over all interior points and, for each point $z_0$ in the destination image, calculates an inverse mapping $f(z_0)$.

The inverse mapping is then used in step 110 to sample the pixel at location $z_0+f(z_0)$ in the source image and write the sampled pixel to the destination. The calculation of the function $f(z_0)$ is discussed next with reference to FIG. 2.

FIG. 2 shows a contour 120 represented as a polygon. The polygon has a plurality of vertexes a, b and c, among others. The angle $\Phi=\Phi_b-\Phi_a$ is the angle between vertexes a and b as observed from point $z_0$.

The polygon vertexes a, b, c . . . in FIG. 2 represent the destination contour. For each vertex in the destination contour, a corresponding vertex, a+A, b+B, c+C in the source image is selected to define a source contour. This process might be reversed, the user might define the source first, and then use some path tools (such as those available in Photoshop or Illustrator, available from Adobe Systems, Inc. of San Jose, Calif.) to modify the source contour into a destination contour. As a result, the warping process is given complex numbers a, b, c . . . and A, B, C . . . and also $z_0$. It is assumed that the path from a to b is described by $z(t)=bt+a(1-t)$. In the same way the path from b to c is described by $z_1(t)=ct+b(1-t)$, and so on. The function value along the path is assumed to be $f(z(t))=Bt+A(1-t)$ between a and b. Similarly, $f(z(t))=Ct+B(1-t)$ between b and c, and so on.

The Cauchy integral formula relates the values of the analytic function at any point $z_0$ inside the contour to the values of the function on the contour. More discussion on this aspect can be found in John B. Conway's book "Functions of One Complex Variable" page 91 (Springer Verlag 1973), among others.

Using the above assumptions and the geometry of FIG. 2, the Cauchy integral formula with contour a-b-c . . . -a is applied to find the displacement at point $z_0$:

$$f(z_0) = \frac{1}{2\pi i} \oint \left( \frac{f(z)}{z-z_0} \right) dz$$

The result is:

$$I = \frac{1}{2\pi i}(I(a,b) + I(b,c) + \ldots + I(\ldots,a))$$

In the above expression, the integral I(a,b) for segment (a,b) is shown below:

$$I(a,b) = \frac{bA - aB}{b-a}\left(i(\varphi_b - \varphi_a) + \frac{1}{2}\log\frac{r_b^2}{r_a^2}\right)$$

where:

$\Phi_b - \Phi a$ is the angle between points a and b as observed from point $z_0$;

log is the logarithm with base e and $r_a^2 = (a_x - z_{0x})^2 + (a_y - z_{0y})^2$ and similar for $r_b^2$.

The same expression is used for the other segments by substituting a→b, b→c, A→B, B→C, and so on.

Two examples of the process of FIG. 1 applied to a picture of a square mesh 130 are shown on FIGS. 3 and 4. In FIG. 3, a source area 134 is shown shaded, and a destination area 132 represents the mesh 130 after warping. The source area 134 and destination area 132 are surrounded by source and destination contours (not shown). The source area 134 is warped into the destination area 132. Similarly, in FIG. 4, a source area 138 is shown shaded, and a destination area 136 represents the mesh 130 after warping. The source area 138 and destination area 136 are surrounded by source and destination contours (not shown). The source area 138 is warped into the destination area 136.

For a given vertex-to-vertex correspondence, it may not be possible to warp certain source contours into certain destination contours using purely analytic functions. In such cases, the process of FIG. 1 generates approximate results. This variance from analyticity is not readily detectable by the user, and the effect of warping is practically the same. The difference is that, under the approximation, angles are not preserved exactly.

If exact preservation of the angles and analyticity of the mapping is required, the two contours have to be chosen so that the following equation known as Cauchy theorem is satisfied:

$$\oint f(z)dz = 0$$

The Cauchy theorem is discussed on pages 80–87 of John B. Conway's book "Functions of One Complex Variable", among others.

Using the above notations and FIG. 2, it can be shown that this is equivalent to making:

$$J = J(a) + J(b) + J(c) + J(d) + \ldots = 0$$

where $$J(b) = \frac{c-a}{2}B$$

$$J(c) = \frac{d-b}{2}C$$

The same expression is used for all other segments by substituting a→b, b→c, A→B, B→C, and so on.

A special "path-correcting" tool may be used to change any source vertex so that the new pair of contours represents analytic function. The change to vertex B+b is:

$$\Delta B = \frac{-2J}{c-a}$$

so that the new source vertex is B+ΔB+b.

The same expression is used for the other vertices by substituting a→b, b→c, A→B, B→C, and so on.

The above analytic warping process can be optimized for warping paths and pixels. The warping of paths is described next.

Analytic Warping of Paths

A path, as used in Adobe Photoshop and other application software is a set of cubic Bezier curves, linked together. A first curve exists from point $p_1$ to point $p_2$ in the image plane, a second curve exists from point $p_2$ to point $p_3$, and so on. Each Bezier curve is defined by start and end points and tangent vector (velocity) at the start and end points.

Transforming a path reduces to transforming two points and two tangent vectors. This is done as follows: forward mapping is used instead of inverse mapping. The result is exactly the same as above in the following sense: given two contours and a point p inside the first contour and a point q inside the second contour, such that p is produced from q by inverse mapping as described above (Analytic Warping of Point Data), then p will also produce exactly q by forward mapping.

In the forward mapping, points a, b, c . . . in FIG. 2 are treated as source; A, B, C . . . are their displacements into the destination. The same (as above) formulas apply so that for each point $z_0$ of the source, the displacement $f(z_0)$ is calculated. In this way, the start and end point of the Bezier curve are mapped into the new start and end points in the destination.

FIG. 5 represents segments of a path before and after transformation. A segment 140 of a path is shown before the transformation by the function f, while a segment 142 represents the segment 140 after transformation. In FIG. 5, p is the starting point of the segment 140, and q is the starting point of the segment 142. The head of the tangent vector 146 at point p is the point p+v. The tangent vector 144 is the result of the mapping of the tangent vector 146.

The calculation of the tangent vector 144 in FIG. 5 is discussed next. If v is the tangent vector 146 at point p, v is usually represented as two points: tail p and head p+v. The transformation of the tail p into a new tail q was discussed above. The head is transformed by scaling v using a number h that is small with respect to one. For example h may be between 0.001 and 0.000001. Then, the point p+h*v is transformed as described above. The result is a new head point in the destination called r. The new transformed vector r−q is multiplied by 1/h, which is the final result for the new tangent vector. Mathematically, in the limit h approaches zero, the above procedure provides the exact result.

Practically, too small a value of h may lead to a loss of precision. This depends on the computer hardware used.

Also, note that floating point representation needs to be used for the above calculations.

Analytic Warping of Pixels

The above process for "Analytic Warping of Point Data" may be slow for large images due to the large number of pixels that have to be processed. A process more appropriate for warping pixel data is described next. Both methods produce identical results inside the contour when starting with identical contours. However, the method described next can generate warping function both inside and outside the contour. In general, it requires as input the displacements at several points, or area(s) or contour(s) and then extrapolates these displacements as analytic functions throughout the whole image. When such analytic functions do not exist, the method generates approximately analytic functions.

Turning now to FIG. 6, a process 150 for warping pixel data is shown. It is based on a relation between analytic functions and the stationary state of the heat flow equation, known also as the diffusion equation, described next. The process 150 initially samples pixel data into one or more pyramid levels and marks boundary pixels in each level (step 152). Next, the process 150 sets the top pyramid level as the current level to process (step 154). The process calculates the stationary state for the current level (step 156), as described in more detail below. The process 150 then checks whether the current level is the bottom pyramid level (step 158). If not, the process 150 writes pixel values to the next lower pyramid level and makes the next lower pyramid level the current pyramid level (step 160). From step 160, the process 150 loops back to step 156 to continue processing the pixel data. Alternatively, from step 158, in the event that the bottom pyramid level has been reached, the process 150 exits.

The stationary state determination in step 156 finds the analytic function f(z) which satisfies the Cauchy-Riemann equations:

$$\frac{\partial u}{\partial x} = \frac{\partial v}{\partial y} \quad \frac{\partial u}{\partial y} = \frac{\partial v}{\partial x}$$

for the real and imaginary parts of f(z)=u(z)+iv(z).

From them follows Laplace's equation:

$$\frac{\partial^2 \psi}{\partial x^2} + \frac{\partial^2 \psi}{\partial y^2} = 0$$

where $\psi$ stands for the real or imaginary parts of f(z). The Cauchy-Riemann and Laplace's equations in relation to analytic functions are discussed in John B. Conway's book "Functions of One Complex Variable" pp. 33–43 (Springer Verlag 1973), among others.

The real and imaginary components of the displacements along the contour are boundary conditions for the real and imaginary versions of the equation. Since they are identical, the process of FIG. 6 applies to both real and imaginary parts of f(z).

Solving Laplace's equation with arbitrary boundary values along an arbitrary boundary is a difficult problem that has no direct solution. The process of step 156 described next constructs an iterative solution for the stationary state of the heat flow equation:

$$\frac{\partial^2 \psi}{\partial x^2} + \frac{\partial^2 \psi}{\partial y^2} = \kappa \frac{\partial \psi}{\partial t}$$

with constant (in time) boundary values equal to those, for which we need to solve the Laplace's equation. This state is a solution of the Cauchy-Riemann equation if the boundary conditions are appropriately chosen.

The solution of the above equation is guaranteed to reach a stationary state. When that state is reached, the term on the right hand side is zero. Then the state calculated is a solution of Laplace's equation in the area inside the boundary. Because of continuity, the boundary condition is also satisfied. In this manner, the generation of the warping function f(z) becomes an image processing problem for two artificial images that describe horizontal and vertical displacements, and their generation is as fast as applying a general filter to the image.

Next is presented an iterative algorithm for finding the stationary state of the above heat flow equation with given boundary values. The process is as fast as an average filter process. The input is a gray scale image that has pixel values at the boundary, equal to the boundary conditions. These pixels are excluded from processing—the process does not write onto them but only reads from them.

The output is a new image, each pixel having gray scale value representing the solution for the stationary state of the heat flow equation with the given boundary values. Some intuition on what is being done can be gained by considering a physical process that is described by the heat flow equation with given boundary conditions. If pixel values represent temperature, the heat flow equation can describe a metal plate that is heated or cooled down at the boundaries so that the temperature there is kept constant. Heat spreads throughout the plate and reaches some equilibrium state.

The left hand side of the heat flow equation represents the Laplacian operator acting on the function Ψ. A widely used numerical representation of the Laplacian operator is:

| 0 | 1 | 0 |
|---|---|---|
| 1 | −4 | 1 |
| 0 | 1 | 0 |

This kernel is placed over a 3×3 pixel area of the image and each of the numbers in the kernel is multiplied by the pixel under it. The result is written to a pixel located under the central box of the kernel, in the output image. The kernel is consecutively placed over each pixel of the input image and the calculation is done m×n times for an m×n image. When the size of the time step is equal to one, the right hand side of the heat flow equation represents the change of the function after one step times k. The new value of the function is set to the old value plus that change. The process is repeated until a stationary state is reached. The process evolves faster for larger value of 1/k, but stability is preserved for $1/\kappa \leq \frac{1}{4}$. That is why the fastest evolution is produced by adding ¼ of the Laplacian operator to the old pixel values at each step. In other words, at each step is performed a convolution with the kernel:

|   |   |   |
|---|---|---|
| 0 | 1 | 0 |
| 1 | 0 | 1 |
| 0 | 1 | 0 | divided by 4.

In order to speed up the evolution, the image is sampled into pyramid levels as described above. Each higher level has two times lower resolution and 4 times less pixels. Now, the above convolution is iterated several times at the highest level until a stationary state is reached. The number of iterations could be as low as 2 or 3 if the highest level image is small enough. After a stationary state is reached at the highest level, the image is sampled into the lower level. Each pixel is copied into the 4 new pixels directly under it in the lower level.

The boundary pixels are not over-written on any of the levels. They are set at the beginning of the process, based only on the user-supplied boundary values. If a pixel in the lower level is marked as a boundary pixel, the pixel is preserved unchanged.

In the same manner, each of the lower levels is consecutively written to, and then processed until the bottom level is processed. If high quality is desired, the bottom level can be processed more than once or a larger and better kernel can be used, as described below.

The time and memory required to perform the whole process for all levels is only slightly more than the time and memory to process the lowest level. This is so because the size of each higher level is ¼ of the size of the lower level, and processing time is proportional to the size. Thus, if the time for processing the lowest level is 1, then the total time is $1 + 1/4 + 1/16 + \ldots = 4/3$.

Ideally, the highest level contains just a few pixels (for example 4×4). Then it can be processed in a single pass. If this is not possible, the highest level processing may be speeded up by using a bigger kernel, for example, the 7×7 kernel below. If a small number of levels is used for large images, the processing will be slow.

A good choice for the Laplacian operator represented by a 3×3 kernel can be found in Berthold Klaus Paul Horn's book "Robot Vision" pp. 164–169 (MIT Press 1986). Other references on the Laplacian kernel and methods of kernel construction include William K. Pratt's book "Digital Image Processing" (John Wiley & Sons, 1991), among others.

In one implementation, a good 3×3 kernel for the above process of step 156 is as follows:

|   |   |   |
|---|---|---|
| 1 | 4 | 1 |
| 4 | 4 | 4 |
| 1 | 4 | 1 |

(divided by 24). This kernel produces highly smooth results.

An even better quality 7×7 representation of the Laplacian operator leads to the kernel shown below:

|   |   |   |   |   |   |   |
|---|---|---|---|---|---|---|
| 0 | 1 | 3 | 5 | 3 | 1 | 0 |
| 1 | 7 | 23 | 32 | 23 | 7 | 1 |
| 3 | 23 | 58 | 72 | 58 | 23 | 3 |
| 5 | 32 | 72 | 80 | 72 | 32 | 5 |
| 3 | 23 | 58 | 72 | 58 | 23 | 3 |
| 1 | 7 | 23 | 32 | 23 | 7 | 1 |
| 0 | 1 | 3 | 5 | 3 | 1 | 0 |

(divided by 992), that can be used for fast, quality processing of the levels.

As a result of the above process, two gray scale images are created—one describing the real and the other describing the imaginary part of the analytic function that produces the displacement at each pixel. Warping itself is done by the inverse mapping algorithm as described above.

The analytic warping process on pixel data is superior to generic analytic warping algorithms above because the process is much faster and is capable of producing the warping function even outside the contour. However, the process uses more memory because it builds and computes the two gray scale images describing f(z). The process works for complex, multi-component and non-closed contours. This is possible because the process does not use directly the Cauchy formula and, as a result, does not depend on any contour. The process only requires as input the displacements at several points or areas. These point displacements are extrapolated for the analytic displacement everywhere in the complex plane. Because the calculated function is analytic (or almost analytic), it preserves angles and defines a uniform warping. When the contours are appropriately selected, the function is exactly analytic, as described above.

Color Correction and Gamut Mapping

The analytic warping process can also be used for color correction and gamut mapping from a first device gamut to a second device gamut. Here is an example when this will be useful and explanation why it is useful. When printing color images on a certain output device, the user may find that some colors displayed on the monitor are not available on that output device, and these colors will need to be clipped or the image may need to be desaturated as described in the Background section. In these cases, an analytic warping of the monitor's color gamut into the output device's color gamut preserves the color appearance and constancy while changing colors so they fit into the second device gamut.

The visual color gamut can be represented in a two-dimensional space as a "visible color gamut diagram" shown in FIG. 7. The colors within the visible color gamut diagram vary according to their coordinates. A white point W associated with a particular device represents the maximum intensities of the three primary colors of the device. This defines the white point. The saturation of a color in the visible color gamut diagram is related to the color's distance from the white point. Approximately, all points at a given distance from the white point have the same saturation; all points along a given line drawn outward from the white point have the same hue. This would be exact in a perceptually uniform color space where the directions of change of hue and saturation are orthogonal to each other at each point in the visible color gamut diagram. The so called u'v' color space is one of the closest approximation of the uniform color space.

Correspondingly, a device color gamut diagram 161 represents the colors capable of being displayed on the device. The white point W is inside the device color gamut diagram 161 of FIG. 7. Typically, the device is capable of displaying a smaller range of colors than are visible by the human eye. An image color gamut diagram represents the colors contained within an electronic image and the image might contain colors that cannot be displayed on the device. More information on color gamuts and uniform color spaces can be found in R. W. G. Hunt' book "Measuring Colour" pp. 67–75 (Ellis Horwood 1991) and in L. G. Thorell et al's book "Using Computer Color Effectively" pp. 173–176 (Hewlett Packard 1990).

FIG. 8 shows a flow chart of a process 200 for color correction by warping a first area into a second area in chromaticity space using an analytic function. Initially, a color gamut associated with a source image is displayed on a computer screen for viewing by a user (step 202). The user draws a first contour, on the color gamut (step 204). The user then manipulates the first contour to arrive at a second contour (step 206). An analytic warping function is generated to provide a unique conformal mapping from the interior of the first contour into the interior of the second contour (step 208) using one of the methods above. Next, all the colors of the source image are mapped to the destination color gamut using the analytic function (step 210) and the resulting image is rendered and sent to the output device (step 212). The above mapping changes chromaticity; luminance is preserved.

The resulting color change is uniform and preserves relationships among colors. This occurs because analytic functions define conformal mapping, i.e., mapping that preserves local shapes and relations. In other words, locally, analytic functions can be factored into scaling and rotation: scaling changes saturation and rotation changes hue while at the same time fitting the input gamut into the desired gamut.

The analytic gamut mapping is also advantageous in another way. When performing color correction, the user might want to change hue or saturation. Exactly this is being done by the analytic function gamut mapping process, which locally changes saturation (by scaling) and hue (by rotation) without reference to any particular white point in chromaticity space. "No reference to any white point" is important because the white point does not represent an intrinsic property of color. It is related to the RGB device that is used. By removing dependency of the color correction process on the white point, a true device independency is achieved.

This process also preserves angles between colors, so that lines of constant hue are preserved orthogonal to lines of constant saturation after the mapping. In this way, the transform does not alter perceptually significant relationships among colors.

FIG. 9 shows the operation of a warping process in an exemplary application where color matching is performed for a display device, in this case a monitor. The warping process presents the user with a window that displays the visible color gamut diagram, the monitor color gamut diagram, and the image color gamut diagram (step 102). Any appropriate coordinate systems, such as ab or uv may be used. Although typically shown as a triangle, the display device color gamut may be any shape. Furthermore, the warping process may display a diagram representing the color gamut of a printer or any other suitable output device instead of or in addition to the monitor color gamut diagram. Although the visible color gamut diagram and the monitor color gamut diagram will typically be completely filled with continuous gradations of color, the image color gamut diagram will only contain colors corresponding to colors contained within the first image, and may therefore contain gaps corresponding to colors that do not appear within a first image.

The user specifies a mapping between part or all of the image color gamut and part or all of the monitor color gamut (step 104). The user may specify this mapping by, for example, drawing a first gamut contour around an area of the image color gamut diagram to be mapped, and by drawing a second gamut contour around the area of the monitor color gamut diagram to which the specified area of the image color gamut should be mapped. To map the entire image color gamut to the entire monitor color gamut, for example, the user would draw the first gamut contour over the outline of the image color gamut diagram and draw the second gamut contour over the outline of the monitor color gamut diagram.

The user might choose for example to map those colors in the image color gamut that fall outside of the monitor color gamut to colors within the monitor color gamut. The user can easily identify such colors visually because points in the image color gamut diagram corresponding to such colors will fall outside of the monitor color gamut diagram.

The warping process generates a contour mapping, which maps the colors along the first gamut contour to the colors along the second gamut contour (step 106). The warping process generates a mapping of the colors within the first gamut contour to the colors, within the second gamut contour, as described above (step 108). The warping process uses the mapping to replace the colors in the first image with the colors in the monitor color gamut to which the colors in the first image have been mapped (step 110). The warping process passes control to an imaging application that displays the first image with its new colors (step 112).

Other ways of performing color gamut warping are possible. For example, upon loading the first image, the warping process may automatically generate a mapping from the entire image color gamut to the entire monitor color gamut and replace the colors in the first image using the mapping in order to ensure that all colors in the image are reproducible on the monitor. Instead of performing such a mapping automatically, the warping process may, for example, present the user with a set of predefined mappings form which to choose.

Color gamut warping may also be used, for example, to map the color gamut of the first image to the color gamut of the second image. For example, the first and second images may be first loaded into memory. The user may then cause a warping process to display the first image color gamut diagram, representing a first color gamut, in conjunction with a second image color gamut diagram, representing a second color gamut. The user may map part or all of the first color gamut to part or all of the second color gamut using the techniques described above.

Once the mapping from the first color gamut to the second color gamut has been generated, the warping process may, for example, replace the colors in the first color gamut with the colors in the second color gamut to which they have been mapped. Alternatively, the warping process may, for example, generate an animation sequence consisting of a sequence of images which, when displayed in succession, shows the first image colors changing gradually from the colors in the first color gamut to the colors in the second color gamut to which they have been mapped. This can be used, for example, to achieve the effect of a daytime scene gradually transforming into a nighttime scene.

In any of the techniques related to the color gamut warping described above, it should be noted that the first and second color gamuts may be any combination of color gamuts. They may be, for example, an image color gamut and a printer color gamut, the visible color gamut and a monitor color gamut, or two image color gamuts.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

FIG. 10 illustrates one such computer system 600, including a CPU 610, a RAM 620, a ROM 622 and an I/O controller 630 coupled by a CPU bus 640. The I/O controller 630 is also coupled by an I/O bus 698 to input devices such as a keyboard 660 and a mouse 670, and output devices such as a monitor 680. The I/O controller 630 also drives an I/O interface 690 that in turn controls a removable disk drive 692 such as a floppy disk, among others.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A computer-implemented method comprising:
   receiving a first enclosing contour defining a first area including a path, the path comprised of at least one Bezier curve;
   receiving a second enclosing contour defining a second area;
   receiving user input defining a correspondence between the first and second enclosing contours;
   using the correspondence to define a mapping that maps the first area into the second area;
   using the mapping to map points defining the Bezier curve in the first area to points in the second area; and
   using the mapped points to generate a transformed path in the second area.

2. The method of claim 1, wherein:
   points defining the Bezier curve include a start point, an end point, a tail and head point representing a first tangent vector and a tail and head point representing a second tangent vector; and
   defining a mapping that maps the tail point and head point representing a tangent vector includes:
      for a tail point p for a tangent vector v in the first area, defining a mapping that maps to a point q in the second area;
      for a head point p+v for the tangent vector v, scaling the tangent vector v using a number h in range of approximately 0.001 to 0.000001, and defining a mapping for a point p+h·v to map to a head point r for a tangent vector r−q in the second area; and
      multiplying the tangent vector r−q by 1/h to determine the tangent vector in the second area.

3. The method of claim 1, wherein using the correspondence to define a mapping comprises calculating a displacement value for a point $z_0$ inside the second enclosing contour by calculating integral I in accordance with the formulas:

$$I = \frac{1}{2\pi i}(I(a, b) + I(b, c) + \ldots + I(x, a))$$

$$\text{and } I(a, b) = \frac{bA - aB}{b - a}\left(i(\varphi_b - \varphi_a) + \frac{1}{2}\log\frac{r_b^2}{r_a^2}\right)$$

where:
   a, b, c ... x are vertices of the second enclosing contour;
   A, B, C ... X are displacements of the vertices a, b, c, ... x, respectively into the first enclosing contour, determined from the correspondence between first and second enclosing contours;
   $\Phi_b - \Phi_a$ is the angle between points a and b as observed from point $z_0$;
   log is the logarithm with base e, and $r_a^2 = (a_x - z_{0x})^2 + (a_y - z_{0y})^2$, and similar for $r_b^2$; and
   I(a, b) is evaluated for each pair of neighboring vertices of the second enclosing contour, up to and including the pairing (x, a).

4. The method of claim 3, wherein:
   points defining the Bezier curve include a start point, an end point, a tail and head point representing a first tangent vector and a tail and head point representing a second tangent vector; and
   defining a mapping that maps the tail point and head point representing a tangent vector includes:
      for a tail point p for a tangent vector v in the first area, defining a mapping that maps to a point q in the second area;
      for a head point p+v for the tangent vector v, scaling the tangent vector v using a number h in range of approximately 0.001 to 0.000001, and defining a mapping for a point p+h·v to map to a head point r for a tangent vector r−q in the second area; and
      multiplying the tangent vector r−q by 1/h to determine the tangent vector in the second area.

5. The method of claim 1, wherein the first enclosing contour is defined on a first image surface and the second enclosing contour is defined on a second image surface.

6. The method of claim 5, wherein the first and second image surfaces are the same image surface.

7. The method of claim 1, wherein the first and second enclosing contours are polygons with the same number of vertices.

8. The method of claim 7, further comprising:
   receiving user input using a path-correcting tool changing a vertex of one of the first and second enclosing contours so that the new pair of contours and the correspondence represent an analytic function.

9. The method of claim 7, wherein:
   the polygons are constructed by sampling two continuous curves on a source image; and
   a vertex to vertex correspondence for the first and second enclosing contours is defined by a user.

10. The method of claim 7, wherein:
the polygons are constructed by sampling two continuous curves on a source image; and
a vertex to vertex correspondence for the first and second enclosing contours is established using length parameters of both contours, starting from a correspondence for one point defined by a user.

11. The method of claim 1, wherein receiving user input defining a correspondence comprises receiving user input manipulating the first enclosing contour to arrive at the second enclosing contour.

12. A computer program product, tangibly stored on a computer-readable medium, comprising instructions operable to cause a programmable processor to:
receive a first enclosing contour defining a first area including a path, the path comprised of at least one Bezier curve;
receive a second enclosing contour defining a second area;
receive user input defining a correspondence between the first and second enclosing contours;
use the correspondence to define a mapping that maps the first area into the second area; and
use the mapping to maps points defining the Bezier curve in the first area to points in the second area; and
use the mapped points to generate a transformed path in the second area.

13. The computer program product of claim 12, wherein:
points defining the Bezier curve include a start point, an end point, a tail and head point representing a first tangent vector and a tail and head point representing a second tangent vector; and
instructions operable to define a mapping that maps the tail point and head point representing a tangent vector include:
for a tail point p for a tangent vector v in the first area, instructions operable to define a mapping that maps to a point q in the second area;
for a head point p+v for the tangent vector v, scaling the tangent vector v using a number h in range of approximately 0.001 to 0.000001, and instructions operable to define a mapping for a point p+h·v to map to a head point r for a tangent vector r−q in the second area; and
instructions operable to multiply the tangent vector r−q by 1/h to determine the tangent vector in the second area.

14. The computer program product of claim 12, wherein instructions operable to use the correspondence to define a mapping comprise instructions operable to calculate a displacement value for a point $z_0$ inside the second enclosing contour by calculating integral I in accordance with the formulas:

$$I = \frac{1}{2\pi i}(I(a, b) + I(b, c) + \ldots + I(x, a))$$

$$\text{and } I(a, b) = \frac{bA - aB}{b - a}\left(i(\varphi_b - \varphi_a) + \frac{1}{2}\log\frac{r_b^2}{r_a^2}\right)$$

where:
a, b, c . . . x are vertices of the second enclosing contour;
A, B, C . . . X are displacements of the vertices a, b, c, . . . x, respectively into the first enclosing contour, determined from the correspondence between first and second enclosing contours;
$\Phi_b - \Phi_a$ is the angle between points a and b as observed from point $z_0$;
log is the logarithm with base e, and $r_a^2 = (a_x - z_{0x})^2 + (a_y - z_{0y})^2$, and similar for $r_b^2$; and
I(a, b) is evaluated for each pair of neighboring vertices of the second enclosing contour, up to and including the pairing (x, a).

15. The computer program product of claim 14, wherein:
points defining the Bezier curve include a start point, an end point, a tail and head point representing a first tangent vector and a tail and head point representing a second tangent vector; and
instructions operable to define a mapping that maps the tail point and head point representing a tangent vector include:
for a tail point p for a tangent vector v in the first area, instructions operable to define a mapping that maps to a point q in the second area;
for a head point p+v for the tangent vector v, scaling the tangent vector v using a number h in range of approximately 0.001 to 0.000001, and instructions operable to define a mapping for a point p+h·v to map to a head point r for a tangent vector r−q in the second area; and
instructions operable to multiply the tangent vector r−q by 1/h to determine the tangent vector in the second area.

16. The computer program product of claim 12, wherein the first enclosing contour is defined on a first image surface and the second enclosing contour is defined on a second image surface.

17. The computer program product of claim 16, wherein the first and second image surfaces are the same image surface.

18. The computer program product of claim 12, wherein the first and second enclosing contours are polygons with the same number of vertices.

19. The computer program product of claim 18, further comprising instructions operable to cause a programmable processor to:
receive user input using a path-correcting tool changing a vertex of one of the first and second enclosing contours so that the new pair of contours and the correspondence represent an analytic function.

20. The computer program product of claim 18, wherein:
the polygons are constructed by sampling two continuous curves on a source image; and
a vertex to vertex correspondence for the first and second enclosing contours is defined by a user.

21. The computer program product of claim 18, wherein:
the polygons are constructed by sampling two continuous curves on a source image; and
a vertex to vertex correspondence for the first and second enclosing contours is established using length parameters of both contours, starting from a correspondence for one point defined by a user.

22. The computer program product of claim 12, wherein instructions operable to receive user input defining a correspondence comprise instructions operable to receive user input manipulating the first enclosing contour to arrive at the second enclosing contour.

23. A computer system comprising:
means for receiving a first enclosing contour defining a first area including a path, the path comprised of at least one Bezier curve;

means for receiving a second enclosing contour defining a second area;

means for receiving user input defining a correspondence between the first and second enclosing contours;

means for using the correspondence to define a mapping that maps the first area into the second area; and means for using the mapping to maps points defining the Bezier curve in the first area to points in the second area; and means for using the mapped points to generate a transformed path in the second area.

24. The system of claim 23, wherein:

points defining the Bezier curve include a start point, an end point, a tail and head point representing a first tangent vector and a tail and head point representing a second tangent vector; and means for defining a mapping that maps the tail point and head point representing a tangent vector includes:

for a tail point p for a tangent vector v in the first area, means for defining a mapping that maps to a point q in the second area;

for a head point p+v for the tangent vector v, means for scaling the tangent vector v using a number h in range of approximately 0.001 to 0.000001, and defining a mapping for a point p+h·v to map to a head point r for a tangent vector r−q in the second area; and means for multiplying the tangent vector r−q by 1/h to determine the tangent vector in the second area.

25. The system of claim 23, wherein means for using the correspondence to define a mapping comprise means for calculating a displacement value for a point $z_0$ inside the second enclosing contour by calculating integral I in accordance with the formulas:

$$I = \frac{1}{2\pi i}(I(a, b) + I(b, c) + \ldots + I(x, a))$$

and $$I(a, b) = \frac{bA - aB}{b - a}\left(i(\varphi_b - \varphi_a) + \frac{1}{2}\log\frac{r_b^2}{r_a^2}\right)$$

where:

a, b, c . . . x are vertices of the second enclosing contour;

A, B, C . . . X are displacements of the vertices a, b, c, . . . x, respectively into the first enclosing contour, determined from the correspondence between first and second enclosing contours;

$\Phi_b - \Phi_a$ is the angle between points a and b as observed from point $z_0$;

log is the logarithm with base e, and $r_a^2 = (a_x - z_{0x})^2 + (a_y - z_{0y})^2$, and similar for $r_b^2$; and I(a, b) is evaluated for each pair of neighboring vertices of the second enclosing contour, up to and including the pairing (x, a).

26. The system of claim 25, wherein:

points defining the Bezier curve include a start point, an end point, a tail and head point representing a first tangent vector and a tail and head point representing a second tangent vector; and means for defining a mapping that maps the tail point and head point representing a tangent vector includes:

for a tail point p for a tangent vector v in the first area, means for defining a mapping that maps to a point q in the second area;

for a head point p+v for the tangent vector v, means for scaling the tangent vector v using a number h in range of approximately 0.001 to 0.000001, and deriving a mapping for a point p+h·v to map to a head point r for a tangent vector r−q in the second area; and means for multiplying the tangent vector r−q by 1/h to determine the tangent vector in the second area.

27. The system of claim 23, wherein the first enclosing contour is defined on a first image surface and the second enclosing contour is defined on a second image surface.

28. The system of claim 27, wherein the first and second image surfaces are the same image surface.

29. The system of claim 23, wherein the first and second enclosing contours are polygons with the same number of vertices.

30. The system of claim 29, further comprising:

means for receiving user input using a path-correcting tool changing a vertex of one of the first and second enclosing contours so that the new pair of contours and the correspondence represent an analytic function.

31. The system of claim 29, wherein:

the polygons are constructed by sampling two continuous curves on a source image; and a vertex to vertex correspondence for the first and second enclosing contours is defined by a user.

32. The system of claim 29, wherein:

the polygons are constructed by sampling two continuous curves on a source image; and a vertex to vertex correspondence for the first and second enclosing contours is established using length parameters of both contours, starting from a correspondence for one point defined by a user.

33. The system of claim 23, wherein means for receiving user input defining a correspondence between the first and second enclosing contours comprise means for receiving user input manipulating the first enclosing contour to arrive at the second enclosing contour.

34. A computer-implemented method comprising:

receiving a first enclosing contour defining a first area;

receiving a second enclosing contour defining a second area;

receiving user input defining a correspondence between the first and second enclosing contours;

using the correspondence to calculate a displacement value for a point $z_0$ inside the second enclosing contour by evaluating the integral I in accordance with the formulas:

$$I = \frac{1}{2\pi i}(I(a, b) + I(b, c) + \ldots + I(x, a))$$

where:

$$I(a, b) = \frac{bA - aB}{b - a}\left(i(\varphi_b - \varphi_a) + \frac{1}{2}\log\frac{r_b^2}{r_a^2}\right)$$

and where:

a, b, c . . . x are vertices of the second enclosing contour;

A, B, C . . . X are displacements of the vertices a, b, c, . . . x, respectively into the first enclosing contour, determined from the correspondence between first and second enclosing contours;

$\Phi_b - \Phi_a$ is the angle between points a and b as observed from point $z_0$;

log is the logarithm with base e and $r_a^2 = (a_x - z_{0x})^2 + (a_y - z_{0y})^2$ and similar for $r_b^2$; and I(a,b) is evaluated for each pair of neighboring vertices of the second enclosing contour, up to and including the pairing (x,a); and warping the first area to the second area by sampling a point of the first area using the displacement value for a point inside the second enclosing contour.

35. The method of claim 34, wherein the first enclosing contour is defined on a first image surface and the second enclosing contour is defined on a second image surface.

36. The method of claim 35, wherein the first and the second image surfaces are the same image surface.

37. The method of claim 34, wherein:

the polygons are constructed by sampling two continuous curves on a source image; and a vertex to vertex correspondence for the first and second enclosing contours is defined by a user.

38. The method of claim 34, wherein:

the polygons are constructed by sampling two continuous curves on a source image; and a vertex to vertex correspondence for the first and the second enclosing contours is established using length parameters of both contours, starting from a correspondence for one point defined by a user.

39. The method of claim 34, wherein the first and second enclosing contours are polygons with the same number of vertices.

40. The method of claim 39, further comprising:

receiving user input using a path-correcting tool changing a vertex of one of the first and second enclosing contours so that the new pair of contours and the correspondence represent an analytic function.

41. The method of claim 34, wherein receiving user input defining a correspondence comprises receiving user input manipulating the first enclosing contour to arrive at the second enclosing contour.

42. The method of claim 34, wherein the first enclosing contour surrounds a first color gamut diagram representing a first color gamut and the second enclosing contour surrounds a second color gamut diagram representing a second color gamut, the method further comprising:

using the calculated displacement values to define a mapping that maps from the first color gamut diagram into the second color gamut diagram.

43. The method of claim 42, further comprising:

using the mapping to replace the colors of the first color gamut in an image with the colors of the second color gamut to which the colors in the first color gamut have been mapped.

44. A computer program product, tangibly stored on a computer-readable medium, comprising instructions operable to cause a programmable processor to:

receive a first enclosing contour defining a first area;

receive a second enclosing contour defining a second area;

receive user input defining a correspondence between the first and second enclosing contours;

use the correspondence to calculate a displacement value for a point $z_0$ inside the second enclosing contour by evaluating the integral I in accordance with the formulas:

$$I = \frac{1}{2\pi i}(I(a,b) + I(b,c) + \ldots + I(x,a))$$

-continued where:

$$I(a,b) = \frac{bA - aB}{b - a}\left(i(\varphi_b - \varphi_a) + \frac{1}{2}\log\frac{r_b^2}{r_a^2}\right)$$

and where:

a, b, c ... x are vertices of the second enclosing contour;

A, B, C ... X are displacements of the vertices a, b, c, ... x, respectively into the first enclosing contour, determined from the correspondence between first and second enclosing contours;

$\Phi_b - \Phi_a$ is the angle between points a and b as observed from point $z_0$;

log is the logarithm with base e and $r_a^2$ $(a_x - z_{0x})^2 + (a_y - z_{0y})^2$ and similar for $r_b^2$; and I(a,b) is evaluated for each pair of neighboring vertices of the second enclosing contour, up to and including the pairing (x,a); and warp the first area to the second area by sampling a point of the first area using the displacement value for a point inside the second enclosing contour.

45. The computer program product of claim 44, wherein the first enclosing contour is defined on a first image surface and the second enclosing contour is defined on a second image surface.

46. The computer program product of claim 45, wherein the first and the second image surfaces are the same image surface.

47. The computer program product of claim 44, wherein:

the polygons are constructed by sampling two continuous curves on a source image; and a vertex to vertex correspondence for the first and second enclosing contours is defined by a user.

48. The computer program product of claim 44, wherein:

the polygons are constructed by sampling two continuous curves on a source image; and a vertex to vertex correspondence for the first and the second enclosing contours is established using length parameters of both contours, starting from a correspondence for one point defined by a user.

49. The computer program product of claim 44, wherein the first and second enclosing contours are polygons with the same number of vertices.

50. The computer program product of claim 49, further comprising instructions operable to cause a programmable processor to:

receive user input using a path-correcting tool changing a vertex of one of the first and second enclosing contours so that the new pair of contours and the correspondence represent an analytic function.

51. The computer program product of claim 44, wherein instructions operable to receive user input defining a correspondence comprise instructions operable to receive user input manipulating the first enclosing contour to arrive at the second enclosing contour.

52. The computer program product of claim 44, wherein the first enclosing contour surrounds a first color gamut diagram representing a first color gamut and the second enclosing contour surrounds a second color gamut diagram representing a second color gamut, the computer program product further comprising instructions operable to:

use the calculated displacement values to define a mapping that maps from the first color gamut diagram into the second color gamut diagram.

53. The computer program product of claim 52, further comprising instructions operable to:
use the mapping to replace the colors of the first color gamut in an image with the colors of the second color gamut to which the colors in the first color gamut have been mapped.

54. A system comprising:
means for receiving a first enclosing contour defining a first area;
means for receiving a second enclosing contour defining a second area;
means for receiving user input defining a correspondence between the first and second enclosing contours;
means for using the correspondence to calculate a displacement value for a point $z_0$ inside the second enclosing contour by evaluating the integral I in accordance with the formulas:

$$I = \frac{1}{2\pi i}(I(a, b) + I(b, c) + \ldots + I(x, a))$$

where:

$$I(a, b) = \frac{bA - aB}{b - a}\left(i(\varphi_b - \varphi_a) + \frac{1}{2}\log\frac{r_b^2}{r_a^2}\right)$$

and where:
a, b, c . . . x are vertices of the second enclosing contour;
A, B, C . . . X are displacements of the vertices a, b, c, . . . x, respectively into the first enclosing contour, determined from the correspondence between first and second enclosing contours;
$\Phi_b-\Phi_a$ is the angle between points a and b as observed from point $z_0$;
log is the logarithm with base e and $r_a^2=(a_x-z_{0x})^2+(a_y-z_{0y})^2$ and similar for $r_b^2$; and
I(a,b) is evaluated for each pair of neighboring vertices of the second enclosing contour, up to and including the pairing (x,a); and
means for warping the first area to the second area by sampling a point of the first area using the displacement value for a point inside the second enclosing contour.

55. The system of claim 54, wherein the first enclosing contour is defined on a first image surface and the second enclosing contour is defined on a second image surface.

56. The system of claim 55, wherein the first and the second image surfaces are the same image surface.

57. The system of claim 54, wherein:
the polygons are constructed by sampling two continuous curves on a source image; and
a vertex to vertex correspondence for the first and second enclosing contours is defined by a user.

58. The system of claim 54, wherein:
the polygons are constructed by sampling two continuous curves on a source image; and
a vertex to vertex correspondence for the first and the second enclosing contours is established using length parameters of both contours, starting from a correspondence for one point defined by a user.

59. The system of claim 54, wherein the first and second enclosing contours are polygons with the same number of vertices.

60. The system of claim 59, further comprising:
means for receiving user input using a path-correcting tool changing a vertex of one of the first and second enclosing contours so that the new pair of contours and the correspondence represent an analytic function.

61. The system of claim 54, wherein means for receiving user input defining a correspondence comprise means for receiving user input manipulating the first enclosing contour to arrive at the second enclosing contour.

62. The system of claim 54, wherein the first enclosing contour surrounds a first color gamut diagram representing a first color gamut and the second enclosing contour surrounds a second color gamut diagram representing a second color gamut, the system further comprising:
means for using the calculated displacement values to define a mapping that maps from the first color gamut diagram into the second color gamut diagram.

63. The system of claim 62, further comprising:
means for using the mapping to replace the colors of the first color gamut in an image with the colors of the second color gamut to which the colors in the first color gamut have been mapped.

* * * * *

UNITED STATES PATENT AND TRADEMARK OFFICE
CERTIFICATE OF CORRECTION

PATENT NO. : 6,734,851 B2
DATED : May 11, 2004
INVENTOR(S) : Todor G. Georgiev

It is certified that error appears in the above-identified patent and that said Letters Patent is hereby corrected as shown below:

Column 20,
Line 16, replace "$r_a^2 (a_x - z_{ox})^2$" with -- $r_a^2 = (a_x - z_{0x})^2$ --

Signed and Sealed this

Seventeenth Day of August, 2004

JON W. DUDAS
*Acting Director of the United States Patent and Trademark Office*